(12) United States Patent
Sanders

(10) Patent No.: US 6,516,051 B2
(45) Date of Patent: Feb. 4, 2003

(54) TESTING VOICE MESSAGE APPLICATIONS

(75) Inventor: Jeremy Guy Sanders, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 09/725,615

(22) Filed: Nov. 29, 2000

(65) Prior Publication Data

US 2002/0006186 A1 Jan. 17, 2002

(30) Foreign Application Priority Data

Jun. 1, 2000 (GB) ............................................. 0013180

(51) Int. Cl.[7] .......................... H04M 1/24; H04M 3/08; H04M 3/22
(52) U.S. Cl. ................................ 379/10.03; 379/27.04; 379/29.02; 702/119; 702/122
(58) Field of Search .............................. 379/1.01, 1.02, 379/9.01, 9.03, 9.06, 10.01, 10.02, 10.03, 15.01, 22.02, 24, 27.01, 29.01, 29.02, 27.04; 702/119, 122

(56) References Cited

U.S. PATENT DOCUMENTS

| | | | |
|---|---|---|---|
| 5,222,083 A | | 6/1993 | Khouri et al. ................. 379/23 |
| 5,488,648 A | * | 1/1996 | Womble ....................... 375/13 |
| 5,572,570 A | * | 11/1996 | Kuenzig ........................ 379/1 |
| 5,633,909 A | * | 5/1997 | Fitch ............................ 379/15 |
| 5,809,108 A | * | 9/1998 | Thompson et al. ........... 379/15 |
| 5,822,397 A | * | 10/1998 | Newman ....................... 379/6 |
| 5,933,475 A | * | 8/1999 | Coleman ....................... 379/1 |
| 5,940,472 A | * | 8/1999 | Newman et al. ................ 379/1 |
| 6,055,298 A | * | 4/2000 | Sugimmoto .................... 379/9 |
| 6,192,108 B1 | * | 2/2001 | Mumford et al. ............... 379/9 |
| 6,304,633 B1 | * | 10/2001 | Adachi et al. ................ 379/12 |
| 6,405,149 B1 | * | 6/2002 | Tsai et al. .................... 702/119 |
| 6,425,096 B1 | * | 7/2002 | Liese et al. .................... 714/43 |

OTHER PUBLICATIONS

IBM "Taking the Muddle out of Messaging", IBM Message Center Version 6 Release 3, IBM Corporation 1999.
Corepoint "Managing and Monitoring the System", Voice Response for AIX, Version 2 Release 2, Mar. 1999.

* cited by examiner

Primary Examiner—Binh Tieu
(74) Attorney, Agent, or Firm—Jeanine S. Ray-Yarletts

(57) ABSTRACT

This invention relates to bulk testing of voice messaging applications by playing back an interaction from a recorded script. During development of a voice response system and application it is necessary to simulate a plurality of calls to the system so that the performance under strain can be monitored. Such a simulation can be performed by a bulk call generator which makes real telephone calls to the IVR through a private branch switch. However with bulk call testing some problems occur which rigorous functional and/or performance testing does not find. This is because real callers behave in unpredictable ways which were not expected or assumed by the creators of the functional and/or performance tests. Accordingly there is provided a test system, method and computer program product for testing a voice application in an interactive voice response (IVR) system, said method comprising: acquiring user interactions from a first voice response application dialogue between the IVR system and a user; mapping user interactions from the first voice response application dialogue into machine readable user interaction data such as a script; reproducing user interactions based on the machine readable user interaction data; and sending the simulated user interactions to a second voice response application under test. This solution addresses the problem by providing actual customer data for recreating customer reported problems in the laboratory instead of relying on a programmed bulk call generator.

27 Claims, 3 Drawing Sheets

TESTING VOICE MESSAGE APPLICATIONS

FIELD OF INVENTION

This invention relates to testing an interactive voice response system and in particular to bulk testing of voice messaging applications.

BACKGROUND OF INVENTION

A function of an interactive voice response (IVR) system is to provide an automated way of communicating information between a user and a business. Although it is unlikely that automated IVR systems will totally replace human operators in the near future they are becoming more pervasive throughout business for simple interactions. For instance while it is still the norm to deal with a human for directory enquiries for national and international calls, simple introductory functions such as acquiring a name are now performed by an IVR and a human interjects with the response or to make a further query. However a fully automatic company IVR directory application exists for company wide enquiries that can respond and query further when there is a problem. It can not be long before these fully automated directory enquiry applications become more pervasive for national and international use.

Voice mail is an IVR application whereby a caller can leave a message for a receiver by dialling directly for connection into a voice mail server. The caller can indirectly leave a message after being connected to a voice mail server after an engaged or timed out telephone call to a party. Once connected to the voice mail server an IVR voice mail application is initiated to service the call. A simple IVR voice mail application may begin by playing a voice prompt asking for the destination voice mail box number (if it does not already know it) and then ask the caller to leave a message which is recorded and stored in the voice mail box. A more complex IVR voice mail application will give the caller various options, for instance, to delete the message, to re-record the message or to forward the message to other voice mail box owners. If the called party who owns the voice mail box wants to listen to the voice mail, a connection to the voice mail server must be made whereby a different voice mail application is initiated. A simple application might allow the owner to listen and delete his messages but a more complex one might allow saving, replying, forwarding to another or other voice mail boxes, or even saving as an attachment and forwarding as an email to somewhere.

During development of a voice response system application, such as a voice mail application, it is necessary to simulate a plurality of calls so that the performance under strain can be monitored. Such a simulation can be performed by a bulk call generator which makes telephone calls to the IVR directly or through a private branch switch. Each simulated telephone call is programmed into the bulk call generator and associated with a particular application. Several types of telephone call may be designed and the bulk caller generator may simulate one or a combination of different calls at the same time using several channels connected to the IVR system.

However some problems still occur in the application which performance testing using programmed simulated calls does not find. This is because real callers behave in unpredictable ways which were not expected or assumed by the programmers of the simulated calls. Functional and/or performance tests are known to be artificial—and although the programmers of the tests may attempt to simulate various aspects of real-life use of voice response systems this is often done by the tester's inside knowledge of the code, which adds to the artificial nature of the testing. Customers sometimes report problems occurring which are so difficult to recreate in the laboratory that debugging the problems becomes almost impossible and occasionally the laboratory may even disbelieve the problem occurs at all. Therefore there is a need for a new type of voice application test system which does not rely on pre-programmed telephone calls to test an IVR system but is concerned more with realistic user interactions.

U.S. Pat. No. 5,222,083 discloses a method for use in developing, testing, debugging and trouble shooting a call progress monitoring (CPM) detection system which is utilised, for example, by a voice messaging system (VMS) One embodiment includes the steps of (a) monitoring at least one voice channel to obtain CPM tones and having a CPM detection system associated with the VMS perform an analysis of the CPM tones, the output of which analysis is referred to as CPM Trace Variables; (b) storing the CPM tones and the CPM Trace variables in a trace file; (c) obtaining a first voice channel; and (d) feeding the voice portion of the CPM trace file to a second channel for playing to the first voice channel. This system is for debugging problems with a call progress monitoring detection system and is primarily interested in recording call progress tones (e.g., ring tone, busy tone), in audio format, for outgoing calls and "trace variables" (analysed call progress tone details)—then "looping back" one voice channel to another so that the first channel can simulate the call progress tones originally detected by playing back the original audio recordings. It does not concern itself with recording user interactions, audio or otherwise.

SUMMARY OF INVENTION

According to one aspect of the invention there is provided a test system as described in claim 1.

This solution provides actual customer data for recreating customer reported problems in the laboratory and for providing performance tests with realistic data. This solution provides an option to record the entire interaction of callers with the IVR system including incoming call data, DTMF keys pressed during the call, voice/silence detection data and hang-up (with exact timings) in a file (or database) for "playback" on voice response units in the laboratory.

In a preferred embodiment the amount of data recorded by the solution is less than the amount of information in the call as only certain events are logged. Some privacy issues (such as recording peoples' private messages) also do not complicate the implementation of this solution. If there is a requirement to not record DTMF data in certain circumstances (e.g., passwords, credit card numbers) then appropriate implementation of the solution (i.e., flagging that confidential data is about to occur on a channel, after which the system only records the timing of the DTMF presses, flagging that confidential data has finished, after which the system records all DTMF presses again) could ensure that such DTMF data is not recorded.

One difference between the prior art and the above solution is that the solution records details (not an audio recording) of user interactions such as DTMF input and voice input (i.e., the fact that voice input is occurring, not the audio of the voice input nor any details of what is actually being said) for incoming calls. The solution is not concerned about network interactions and the subsequent success or failure of outgoing calls, call progress tones, etc. as described in the US patent publication mentioned above.

Advantageously the user interaction data may be extracted directly from the voice input channels during a live user interaction. This might be used for instance during laboratory development whereby the testers are creating telephone calls to be simulated by making telephone calls and whereby the voice response test system records the interactions for later simulation. More advantageously it may be extracted from trace data recorded during real live user interactions. This might be used in the case where trace data is already available from a voice response application.

Preferably the user interaction data may comprise at least one event with at least one associated property, whereby the event may be an indication of a tone event such as when a DTMF key is pressed during the IVR dialogue. Such interaction data may further comprise properties of tone type (such as the specific DTMF key) produced during the call, timing of the tone, and possibly other details such as the duration of the tone and the channel. Alternatively or additionally the event may comprise an indication of voiced or silence event periods with timing and duration properties. In a further alternative or addition the event may comprise actual voice data of a voiced period with timing and duration periods. In yet a further alternative or addition the event may comprise an indication of a hang up event and the timing of such an event when it occurs in a voice response application.

The voice application test system preferably further comprises backup means for recording the original state of the first telephony application including associated data, variables and registers. This means that diagnostic tests will be more realistic since traffic and specific problems can be recreated in the laboratory based on data of actual user interactions rather than requiring the customer to recreate the traffic or specific problem for the laboratory. The data could include as much detail as all of the voice prompts and the entire contents of the customer database.

Additionally the voice application test system preferably further comprises a call editing tool so that the user interactions as recorded by the extracting means may be manipulated and changed. In the case of performance tests, once the data had been recorded it could be manipulated in ways which should preserve the original "meaning" of the data (e.g., the time between calls could be decreased as long as the order of the calls was maintained).

The extracting means preferably identifies and records user interactions from more than one voice response application dialogue and stores user interactions from each dialogue in a separate and corresponding file. However in an alternative embodiment the extracting means could store each user interaction for all the dialogues in a single file as long as the channel number was associated with the calls so that the appropriate channel could be used when reproducing each user interaction.

The extracting means associates each file with properties of the dialogue so that each call may be uniquely identified and selected by the simulation means. Most preferably the extracting means associates each file with the absolute time it started recording the user interactions for that dialogue so that the simulation means selects each file in the order in which the actual interaction occurred.

DESCRIPTION OF DRAWINGS

In order to promote a fuller understanding of this and other aspects of the present invention, an embodiment will now be described, by way of example only, with reference to the accompanying drawings in which.

DETAILED DESCRIPTION OF PREFERRED EMBODIMENT

The embodiment is implemented using scripting commands and standard APIs in IBM Message Centre for DirectTalk. The embodiment is provided in IBM Message Centre to allow a bulk call application to provide the machine readable code representing user interactions in a particular dialogue.

Figure 1:
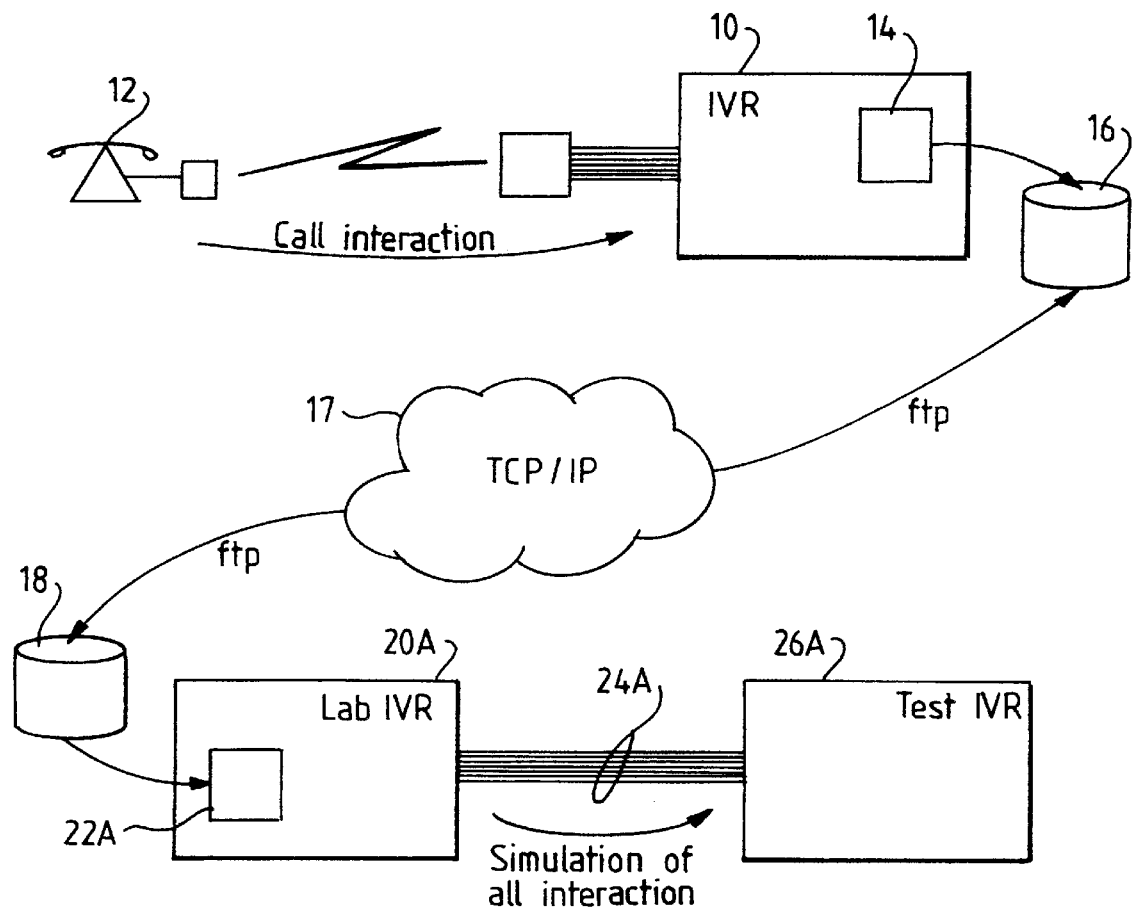
FIGS. 1A,B,C represent an overview of the embodiment of the invention.

FIG. 1 represents an overview of an embodiment of the invention. In FIG. 1A a customer or test interactive voice response system (IVR) 10 can receive a call from a caller 12 and by means of a call data recorder 14 stores details of the call in a file on disk 16. The details include call time; an automatic number indication (ANI) number; a dialled number indication service (DNIS) number; DTMF keys when and for how long they were pressed; and voice signals detected. After the call is completed the file may be transferred across a network 17 to storage 18A of part of a development IVR system 20A. Development IVR 20A uses the details in disk 18A to generate the same call by means of a call simulator 22A across telephony lines 24A to a test IVR system 26A.

In this embodiment of the invention the extraction means 12A and the simulation means 22A reside on separate voice response systems however there is no reason why the extraction and the simulation means could not reside on the same machine where the generating of calls and testing is conducted at the customer site or where the original calls are recorded at the developers site.

In the above embodiment the IVR system and application reside on a different IVR platform 26A however there is no reason why the IVR applications for testing could not reside on the same platform that generates the calls. In another embodiment the simulator 22B outputs telephony hardware events which are fed back into the telephony system and trigger software events in the voice response application. In a further embodiment simulator 22C directly outputs software events which simulate the telephony hardware events to telephony applications on the same system.

Figure 2:
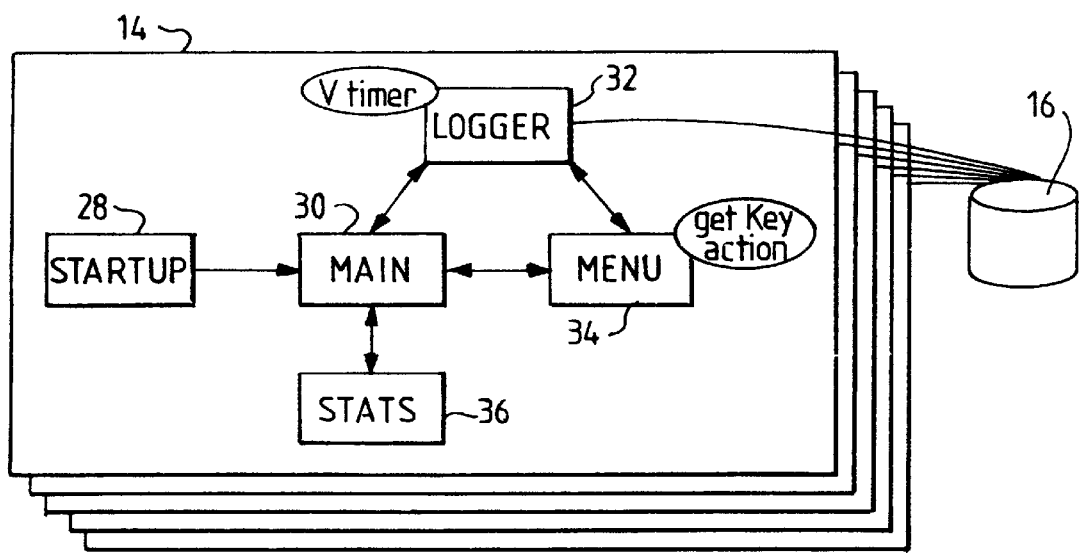
FIG. 2 which represents a call data recorder.

FIG. 2 represents call data recorder 14 embodied in a IVR application comprising: a start-up component 28; main component 30; logger component 32; menu component 34; and statistics component 36.

The start-up component 28 is responsible for initialising variables for use in the IVR processing of the call—including placing the called and calling number in suitable variables, determining whether various features are enabled or disabled (e.g., ability to transfer to an operator) and setting various defaults (e.g., which menu variant to use).

The main component 30 is responsible for the mechanics of performing various complex IVR operations, such as retrieving details from a database, updating details in a database, answering calls, invoking the main component 34 and terminating the call. This usually calls the statistics component 36 to indicate various features or functions have been used for statistical purposes. In the embodiment the logger 32 component is also called to record the details of the start of a call (including called and calling number) and the end of a call.

The menu component 34 is responsible for playing the prompts to which users of the IVR are expected to respond with DTMF key input. This usually returns return codes to the main component 30 to indicate which complex IVR operations are required, or to indicate that processing is complete. In the embodiment this also calls the logger component 32 to record the details of any key input received.

The statistics component 36 is responsible for recording various features or functions have been used within a particular call—this builds up a string representing the features and functions which have been invoked in a particular call and at the end of a call will log these details to disk along with the start and end time of the call and the called and calling number details. This makes it easy to determine which features or functions have been used within a particular call—but the details are recorded in the order of the end-times of calls rather than the start times and do not detail the exact key input used, making the statistics log inappropriate to use for reproducing the events in the call in the call simulator 22.

The logger component 32 logs details to disk incoming call details, key input received and call termination—all with exact timing details and details of which channel the events occurred at. The simplest manner to log these details for use by the call simulator 22 is to log a record for each event as details of the event are received. This means that details for a single call on a particular channel will be contained in many entries in the real-life call data log, which may have details of events occurring on other channels in-between. This makes the data log difficult to read to determine which features or functions have been used within a particular call, but very easy to use for reproducing the events in the call in the call simulator 22.

Figure 3:
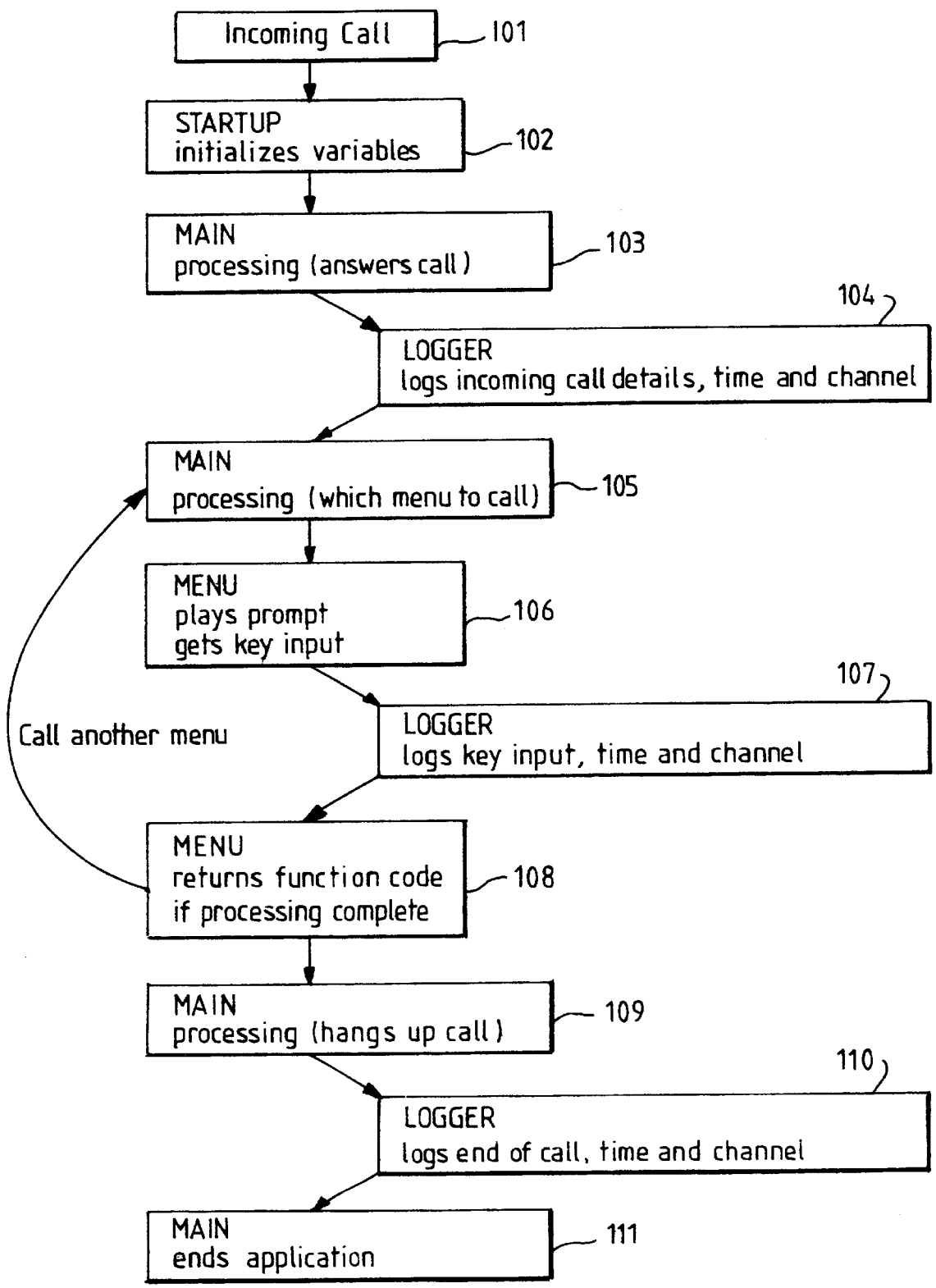
FIG. 3 illustrates the steps of the call data recorder.

FIG. 3 illustrates the steps in which the logger component 32 is used by the main and menu components to log the real-life call data:

In step 101 an incoming call first causes the start-up component to initialise (step 102) variables to be used in the IVR application. The start-up component invokes the main component which answers the call (step 103) and invokes the logger component to log (step 104) the details of the incoming call.

The logger component at this point logs the details of the incoming call, including the details of the channel the event occurs on and the exact timing of this event. An example of such logged data which would be logged in a single script line (record) of the file might be: 2000/03/15-11:34:16.476-14-IC-249800-?

In this example an incoming call on Mar. 15, 2000 at 11:34:16 and 476 ms was detected on channel 14 and the number called was 249800, whereas the calling number was unknown (thus the question mark). The logger component then returns control to the main component which may perform additional processing and then invoke (step 105) the menu component when it has determined which menu to use.

The menu component plays (step 106) the appropriate prompt and waits for key input from the caller. Upon receiving key input it invokes the logger component to log (step 107) the details of the key input received. An example of such a record for this might be: 2000/03/15-11:34:25.765-14-K0 . . . which would represent that DTMF key 0 was detected on channel 14 at 11:34:25 and 765 ms.

The logger component would return to the menu component, which would then in turn return to the main component indicating (step 108) which feature or function was to be performed. The main component may perform additional processing or call the menu component again if further prompts were to be played or input required.

Eventually the main component would hang up the call on the IVR as a result of the caller hanging up the phone (step 109) and call the logger component to log (step 110) the time that the call was hung up by the caller. An example of such a record for this might be: 2000/03/15-11:35:01.986-14-HU After the logger component had returned to the main component the main component would end (STEP 111) the application running on this channel.

Figure 4:
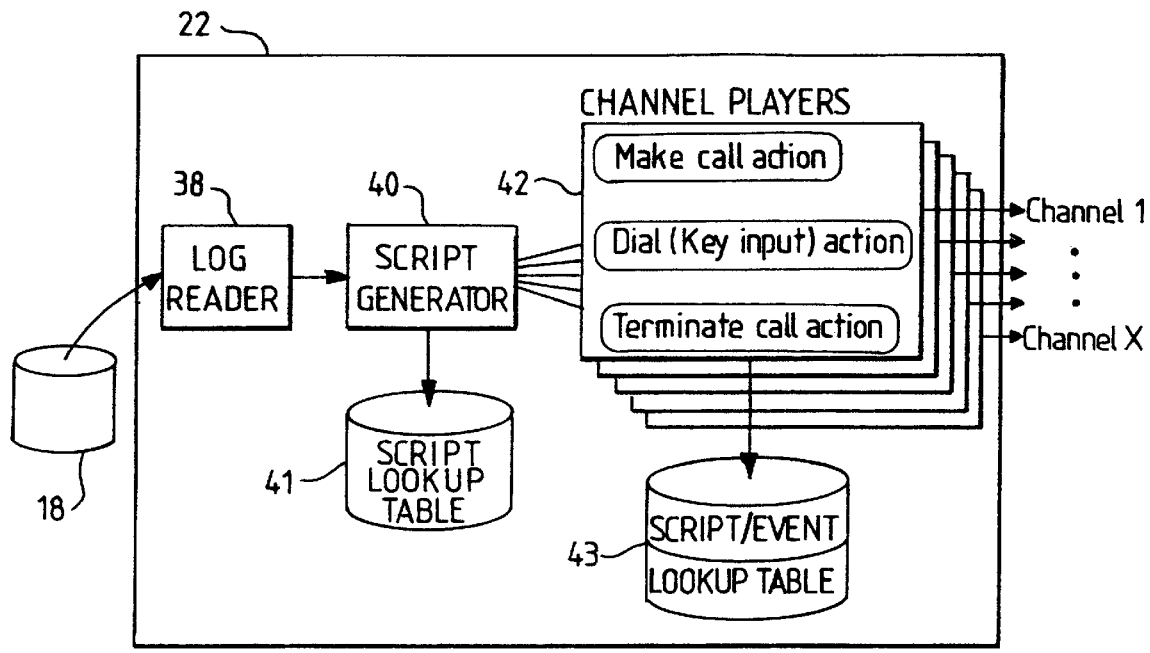
FIG. 4 is a schematic representation of a call simulator of the embodiment.

FIG. 4 is a schematic representation of the call simulator 22 of the embodiment. The call simulator 22 comprises: log reader component 38; script generator component 40 and channel player components 42. The log which has been transferred to the bulk call generator machine or call simulator application contains details of call start times, key input and call end times—all with timings and details of which channels the events occurred on.

The log reader component 38 reads this log, line (record) by line (record) and passes details to the script generator component 40 at the request of the script generator component 40.

The script generator component 40 converts the details in the log into scripts for use by a bulk call generator or call simulator application. It is envisaged that the script generator 40 could be used to simply dump scripts to disk for later use, but in the diagram shown it waits for the intervals between the call events in the log and passes details to the channel player 42 components at the times that events are to occur. There need be only a single log reader 38 and script generator 40 process, but there will be multiple channel player 42 processes, one for each channel events are occurred on. The script generator takes each event as it has been recorded and maps it against a script command held in a script lookup table 41 for that event. The script command is readable to allow the same event to be produced in another interation.

The channel player components 42 carry out the actions as indicated by the script generator component—for example, in the case of a record in the real-life call data log which read: 2000/03/15-11:34:16.476-14-IC-249800-? . . . the script generator would generate a command after an interval between the time on the previous record and the time on this record such as: SV228=14; # ensures that channel 14 is used MakeCall(249800, ######, 0, 0, 0); # makes a call to the lab IVR using the same application as the data was originally recorded for.

In similar fashion a record which reads: 2000/03/15-11:34:25.765-14-K0 . . . would generate a command such as: SV228=14; # ensures that channel 14 is used Dial(0, #, 0, 0, 0); # dial DTMF key 0 on this channel The channels which receive the generated or simulated calls should respond in an identical fashion to the channels on the original IVR. The channel player 42 accesses a script/event lookup table 43 to acquire the call information which allows the event to be reproduced in the IVR.

Figure 5:
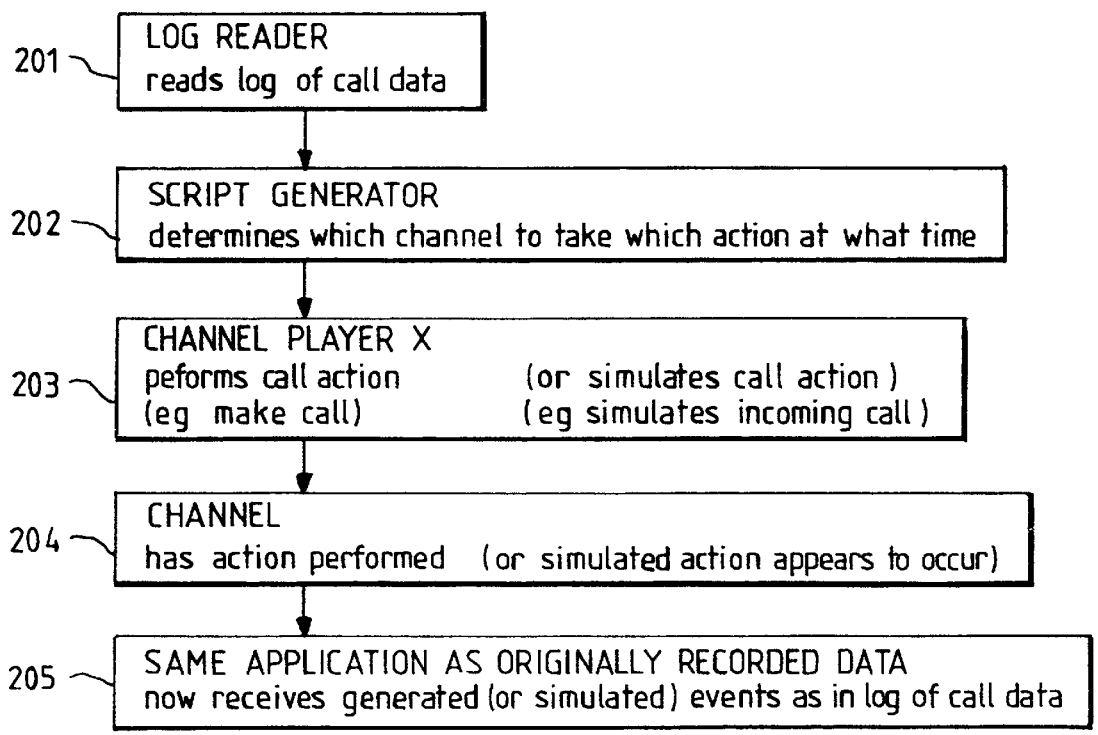
FIG. 5 illustrates the steps of the call simulator.

FIG. 5 is a schematic representation of the method of the call simulator 22.

The log reader component 38 reads (step 210) the log of call data and passes the details to the script generator component 40.

The script generator component 40 determines (step 202) which channel to take which action on at what time, and passes details to an appropriate channel player.

A channel player performs or simulates the events at step 203. The channel player is performing actions on a channel on a IVR which is running the same application as that which had the data originally recorded. This channel on the lab IVR now receives generated or simulated events and should respond in an identical fashion to the channels on the original IVR.

These examples are for a simple IVR application using only DTMF input. Further details would be recorded for voice messaging applications or voice recognition applications as detailed in previous diagrams and the original submission.

EXAMPLE 1

Caller Leaves a Message—Details Recorded
11:05:34 incoming call to 247435 from 01962851825. no voice or tones were heard for 24 seconds. voice was heard for 16 seconds. end of call.

| Start Time | Detected |
| --- | --- |
| 11:05:34 | Incoming call from 01962851825 |
| 11:05:35 | Silence on line |
| 11:05:51 | Voice on line |
| 11:06:07 | Caller hung up |

EXAMPLE 2

Caller Logs on to Retrieve a Message—Details Recorded
11:12:45 incoming call to 249800 from 247435. no voice or tones were heard for 2 seconds. at second 3 DTMF key 2 was detected. at second 3 DTMF key 4 was detected. at second 4 DTMF key 7 was detected. at second 4 DTMF key 4 was detected. at second 5 DTMF key 3 was detected. at second 5 DTMF key 5 was detected. at second 6 DTMF key # was detected. between second 6 and second 8 a valid password was entered. no voice or tones were heard for 3 seconds. at second 12 DTMF key 1 was detected. at second 12 DTMF key 1 detected. at second 13 DTMF key 1 was detected. no voice or tones were heard for 16 seconds. end of call.

| Start Time (secs) | Detected |
| --- | --- |
|  | Incoming call from 247435 to 249800 |
| 1 | Silence on line |
| 3 | DTMF 2 |
| 3 | DTMF 4 |
| 4 | DTMF 7 |
| 4 | DTMF 4 |
| S | DTMF 3 |
| 5 | DTMF 5 |
| 6 | DTMF # |
| 6 | DTMF 1234# |
| 9 | Silence on line |
| 12 | DTMF 1 |
| 12 | DTMF 1 |
| 13 | DTMF 1 |
| 14 | Silence on line |
| 30 | Caller hung up |

In summary there is described bulk testing of voice messaging applications by playing back an interaction from a recorded script. During development of a voice response system and application it is necessary to simulate a plurality of calls to the system so that the performance under strain can be monitored. Such a simulation can be performed by a bulk call generator which makes real telephone calls to the IVR through a private branch switch. However with bulk call testing some problems occur which rigorous functional and/or performance testing does not find. This is because real callers behave in unpredictable ways which were not expected or assumed by the creators of the functional and/or performance tests. Accordingly there is provided a test system, method and computer program product for testing a voice application in an interactive voice response (IVR) system, said method comprising: acquiring user interactions from a first voice response application dialogue between the IVR system and a user; mapping user interactions from the first voice response application dialogue into machine readable user interaction data such as a script; reproducing user interactions based on the machine readable user interaction data; and sending the simulated user interactions to a second voice response application under test. This solution addresses the problem by providing actual customer data for recreating customer reported problems in the laboratory instead of relying on a programmed bulk call generator.

Now that the invention has been described by way of a preferred embodiment, various modifications and improvements will occur to those person skilled in the art. Therefore it should be understood that the preferred embodiment has been provided as an example and not as a limitation.

What is claimed is:

1. A system for generating a test script for an interactive voice response (IVR) test system comprising:
   recording means for acquiring user input data and IVR input data from a first voice response application dialogue between the IVR system and a user;
   mapping means for mapping the user input data into a machine readable test script;
   simulation means for producing user input interactions based on said mapped machine readable test script; and
   output means for sending the simulated interactions to a voice response application under test.

2. A system as in claim 1 whereby the recording means acquires user interactions directly from voice input channels in the IVR durinq a live user interaction.

3. A system as in claim 2 whereby the machine readable test script comprises at least one event with at least one associated property.

4. A system as in claim 3 wherein the machine readable test script further comprises a tone event with at least one associated tone property.

5. A system as in claim 4 wherein the machine readable test script further comprises an indication of voiced or silence event periods with timing and duration properties.

6. A system as in claim 5 wherein the machine readable test script further comprises actual voice data of a voiced period with timing and duration periods.

7. A system as in claim 6 further comprising an indication of a hang up event and the timing of such an event when it occurs in a voice response application.

8. A system as in claim 7 further comprising backup means for recording the original state of the first telephony application including associated data, variables and registers.

9. A system as in claim 8 further comprises a call editing tool for manipulating the machine readable test script.

10. A method of generating a test script for an interactive voice response (IVR) system comprising:
    acquiring user interactions from a first voice response application dialogue between the IVR system and a user;

mapping user interactions from the first voice response application dialogue into a machine readable test script;

reproducing user interactions based on said mapped machine readable test script; and sending the simulated user interactions to a voice response application under test.

11. A method as in claim 10 further comprising acquiring user interactions directly from the voice input channels during a live user interaction.

12. A method as in claim 11 whereby the machine readable test script comprises at least one event with at least one associated property.

13. A method as in claim 12 wherein the machine readable test script further comprises a tone event.

14. A method as in claim 13 wherein the machine readable test script further comprises an indication of voiced or silence event periods with timing and duration properties.

15. A method as in claim 14 wherein the machine readable test script further comprises actual voice data of a voiced period with timing and duration periods.

16. A method as in claim 15 wherein the machine readable test script further comprises an indication of a hang up event and the timing of such an event when it occurs in a voice response application.

17. A method as in claim 16 further comprising recording the original state of the first telephony application including associated data, variables and registers as a backup file.

18. A method as in claim 17 further comprising manipulating the machine readable test script using an editing tool.

19. A computer product comprising a computer readable medium for use in generating a test script for an interactive voice response (IVR) system, the medium having recorded thereon computer code for instructing the steps of:

acquiring user interactions from a first voice response application dialogue between the IVR system and a user;

mapping user interactions from the first voice response application dialogue into machine readable test script;

reproducing user interactions based on said mapped machine readable test script; and sending the simulated user interactions to a voice response application under test.

20. A computer product as in claim 19 further comprising program code for acquiring user interactions directly from the voice input channels during a live user interaction.

21. A computer product as in claim 20 whereby the machine readable test script comprises at least one event with at least one associated property.

22. A computer product as in claim 21 wherein the machine readable test script further comprises a tone event.

23. A computer product as in claim 22 wherein the machine readable test script further comprises an indication of voiced or silence event periods with timing and duration properties.

24. A computer product as in claim 23 wherein the machine readable test script further comprises actual voice data of a voiced period with timing and duration periods.

25. A computer product as in claim 24 wherein the machine readable test script further comprising an indication of a hang up event and the timing of such an event when it occurs in a voice response application.

26. A computer product as in claim 25 further comprising program code for recording the original state of the first telephony application including associated data, variables and registers as a backup file.

27. A computer product as in claim 26 further comprising program code for manipulating the machine readable test script.

* * * * *